United States Patent [19]

Stroop

[11] Patent Number: 5,563,628
[45] Date of Patent: Oct. 8, 1996

[54] HAND HELD COMPUTER CURSOR CONTROLLER AND COMMAND INPUT DEVICE

[76] Inventor: Jeffrey A. Stroop, 1914 Saddlebrook Dr., Murfreesboro, Tenn. 37129

[21] Appl. No.: 385,061

[22] Filed: Feb. 6, 1995

Related U.S. Application Data

[63] Continuation of Ser. No. 135,078, Oct. 12, 1993, abandoned.

[51] Int. Cl.⁶ ........................................................ G09G 5/00
[52] U.S. Cl. ............................................ 345/156; 345/173
[58] Field of Search ...................................... 345/156, 157, 345/161, 163, 173; 273/148 B, 434, 438, DIG. 28; 200/6 R, 6 A; 341/20, 21; 400/482; D21/13, 18; 74/471 XT

[56] References Cited

U.S. PATENT DOCUMENTS

| | | | |
|---|---|---|---|
| D. 300,023 | 2/1989 | DeRamus, Jr. | D21/48 |
| 4,509,383 | 4/1985 | Yeh | 200/6 A |
| 4,552,360 | 11/1985 | Bromley | 273/148 B |
| 4,604,502 | 8/1986 | Thomas | 200/6 A |
| 4,891,632 | 1/1990 | Chang | 340/710 |
| 5,063,376 | 11/1991 | Chang | 340/706 |
| 5,132,672 | 7/1992 | Clark | 340/710 |

FOREIGN PATENT DOCUMENTS

| | | | |
|---|---|---|---|
| 0083925 | 6/1980 | Japan | 345/173 |
| 2244546 | 12/1991 | United Kingdom . | |

Primary Examiner—Richard Hjerpe
Assistant Examiner—Chanh Nguyen
Attorney, Agent, or Firm—Waddey & Patterson; Mark J. Patterson

[57] ABSTRACT

A computer controller is described which can be held in and operated by one hand. A thumb operated cursor control is mounted at the top of a pedestal with a grip section extending laterally rearward. Point and click buttons, operated by the user's index and middle fingers, are mounted forward of the pedestal and underneath the grip section. A stabilizing base is attached to the lower end of the pedestal.

1 Claim, 2 Drawing Sheets

HAND HELD COMPUTER CURSOR CONTROLLER AND COMMAND INPUT DEVICE

This application is a continuation of application Ser. No. 08/135,078 filed Oct. 12, 1993, now abandoned.

BACKGROUND OF THE INVENTION

The present invention relates generally to devices used to provide screen cursor position and other control information to a computer and more particularly to a computer controller device which is operable while being held in the hand above the desk or other work surface.

It will be appreciated by those skilled in the art that hand operated devices used for screen cursor control and for initiating certain basic computer operations are used extensively, particularly with personal computers having a graphical or "icon" based user interface. Most such devices, conventionally known as a "mice", function by being rolled or moved around on a planar work surface. The translation of the mouse about the surface produces control signals which are interpreted by firmware or software in the computer to cause coordinated movement of the cursor on the screen of the computer's video display. Conventional mice also typically include one or two momentary or intermittent contact control switches which can be programmed to trigger certain "point and click" computer operations, such as dropping and dragging of text or selection of pull down menu items.

Controllers which depend on movement of the device across a work surface, of course, occupy up space which could otherwise be allocated to other tools or tasks. Further, constant manipulation of the mouse around the work surface can produce repetitive movement discomfort or injury, carpal tunnel syndrome for example. Accordingly, some computer manufactures have included or offered controller devices which remain stationary during use, requiring the user to rotate a "trackball" in order to produce the desired movement of the screen cursor. Users of laptop or notebook sized personal computers have found stationary hand operated controllers to be particularly valuable. Unfortunately, none of the stationary trackball and other hand operated controllers developed for computer users offer the flexibility and freedom to operate the controller when completely separated from the work surface or computer.

U.S. Pat. No. 4,552,360 issued to Bromley, et al on Nov. 12, 1985, discloses a hand held video controller which controls the movement and rate of movement of a plurality of game objects on a video game screen.

U.S. Pat. No. 4,891,632 issued to Chang on Jan. 2, 1990, teaches a computer graphic drawing apparatus with coarse and fine controls. This device depends in part on movement of a roller ball.

U.S. Pat. No. 5,063,376 issued to Chang on Nov. 5, 1991, describes a mouse controller with an integral numeric keypad.

U.S. Pat. No. 5,132,672 issued to Clark on Jul. 21, 1992, discloses a mouse used on a work surface which includes a finger operated control which introduces a third degree of freedom. It is not intended for use while being held in the hand above the work surface.

What is needed, then, is a computer controller which can be operated while being held in one hand, away from a planar work surface, and which reduces the risk of repetitive motion injury by allowing the user to manipulate the controller in a variety of positions. Such a hand held controller is presently lacking in the prior art.

SUMMARY OF THE INVENTION

To satisfy the objectives of having the ability to provide screen cursor and other control information to a computer, using a hand held device, the present invention discloses a hand held computer controller which takes advantage of the natural flexion of the thumb. The hand held computer controller of the present invention rests on an integrally formed base which allows the controller to be placed on a flat surface when not in use. Rising from the base is a pedestal section which terminates at its upper end in a flat thumb rest. A grip section extends laterally rearward from the pedestal section at a slight downward angle. A multidirectional cursor control pad that can be operated by the user's thumb, and is responsive to pressure place thereon at different locations, is centered within the thumb rest. Two separate control buttons, operated by the user's index and middle fingers are located, on the front of the pedestal and on the lower surface of the grip respectively. These correspond to the left and right "click" buttons of a conventional mouse.

Accordingly, one object of the present invention is to provide a computer controller which is easy to use while being held in one hand.

Another object of the present invention is to provide a hand held computer controller which takes advantage of the natural flexion of the fingers and thumb to prevent stress and injury to the hand and wrist.

A still further object of the present invention is to provide a computer controller which does not have to be operated on a flat surface thereby freeing up additional work space.

DESCRIPTION OF THE PREFERRED EMBODIMENT

Figure 1:
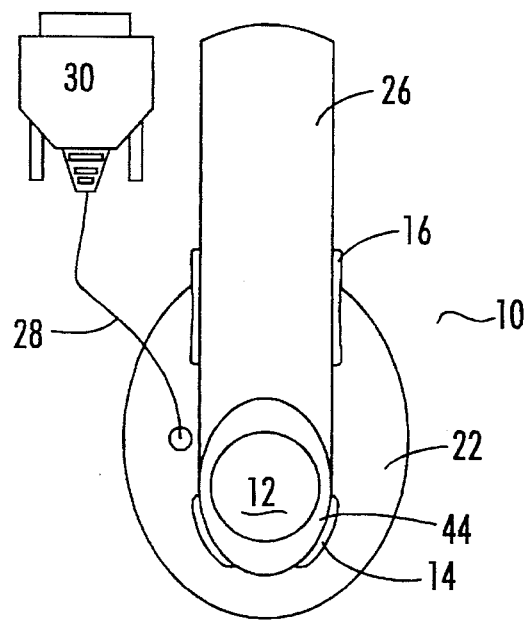
FIG. 1 is a plan view of the hand held computer controller of the present invention.
Figure 2:
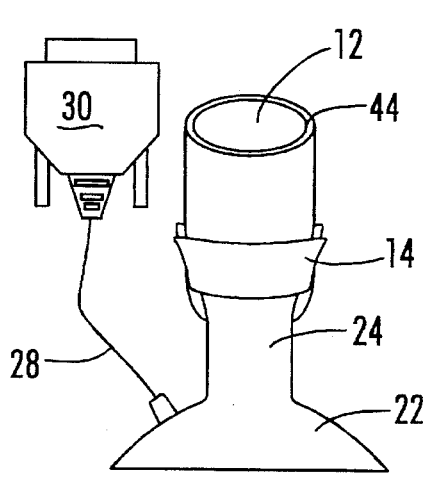
FIG. 2 is a front view of the hand held computer controller of the present invention.
Figure 3:
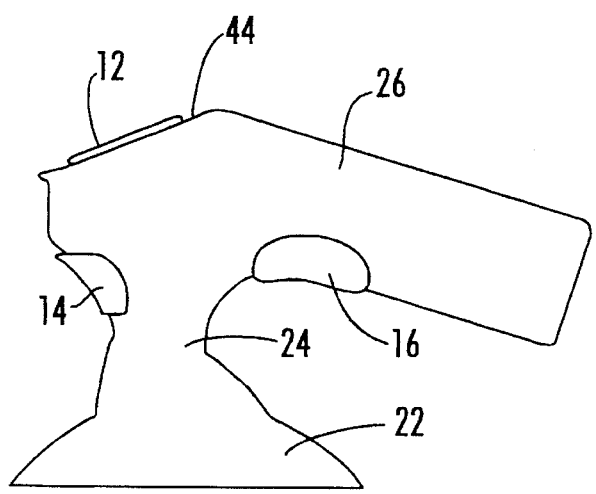
FIG. 3 is a side view of the hand held computer controller of the present invention.

Referring now to FIGS. 1–3, there is shown generally at 10 the hand held computer controller of the present invention. The exterior structure of controller 10 is preferably integrally formed of plastic or other lightweight material to generally define a base 22, a pedestal section 24, and a grip section 26. As best seen in FIG. 1, base 22 extends outwardly from the lower end of pedestal section 24 to form a generally circular or oval structure with a flat bottom surface, thereby allowing controller 10 to be placed on a surface when not in use. Extending vertically upwardly from base 22, pedestal section 24 terminates at its upper end in a generally circular thumb rest 44 which, as best seen in FIG. 3, is angled downwardly away from grip section 26, at approximately a 40 degree angle. Depending on the materials used, base 22 can be weighted to provide greater stability in the resting mode and can optionally be separable from pedestal section 24.

Grip section 26 has a cylindrical shape so as to be adapted for comfortable grasping by the crux or center portions of the user's fingers, with pedestal section 24 separating the distal ends of the index and middle fingers. Grip section 26 extends laterally away from and rearward of pedestal 24, and is angled downwardly. This facilitates use of the ring and small fingers to stabilize controller 10 while in use.

Three control signal generating mechanisms are incorporated in a preferred embodiment of controller 10. Centrally disposed within thumb rest 44 is cursor control 12 which is operated by the user's thumb. Cursor control 12 preferably generates electrical signals which vary in response to pressure placed on the button pad surface at varying locations within one or more quadrants or other distinct sections electrically and mechanically defined underneath the pad surface. These signals are then received and interpreted by the computer to generate corresponding movement of the cursor on the monitor screen. A multi-directional pressure pad suitable for cursor control 12, and which includes a circuit board 18 (FIG. 5) for generating appropriate cursor movement signals, is the "PortaPoint" product distributed by Interlink Electronics of Carpinteria, Calif.

A first command control button 14 is mounted within the forward surface of pedestal section 24, and is angularly disposed, as shown on FIG. 3, upwardly and away from pedestal section 24 at the junction between pedestal section 24 and grip section 26, so that button 14 can be conveniently operated by the index finger. A second command control button 16 is mounted within the lower surface of grip section 26, proximate pedestal section 24, such that it can be comfortably operated by the user's middle finger. A shown on FIG. 3, the operable surfaces of control buttons 14 and 16 are curved into generally a "saddle" shape around their respective mounting surfaces so that they are equally accessible by either a left or right handed user. If controller 10 is used as a replacement for a conventional personal computer mouse, first and second control buttons 14 and 16 will perform the point and click functions of the traditional right and left mouse buttons. Accordingly, buttons 14 and 16 will be pushbutton, spring-loaded momentary contact type switches.

Figure 4:
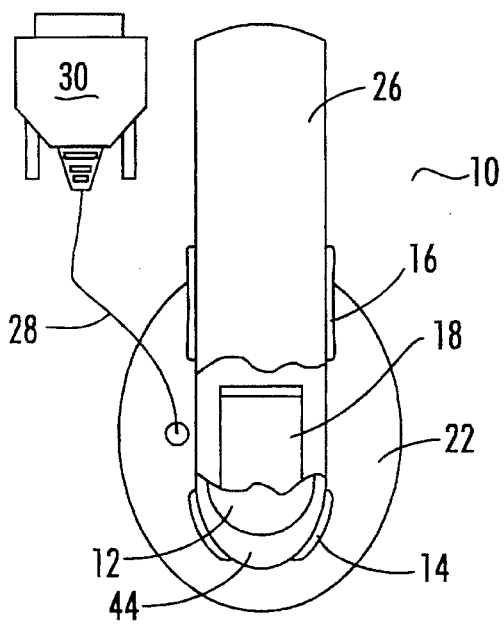
FIG. 4 is a partially cut-away plan view of the hand held computer controller of the present invention.
Figure 5:
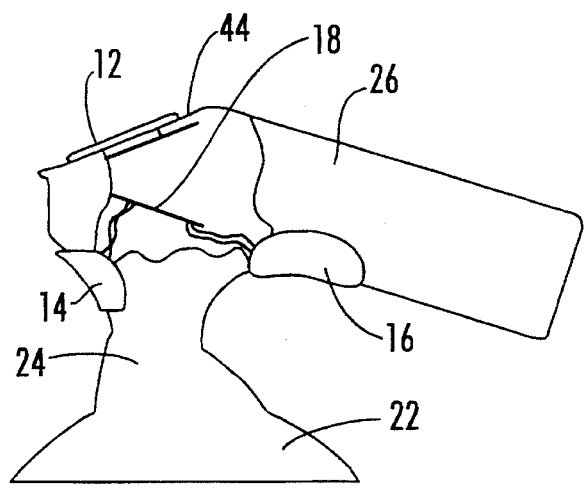
FIG. 5 is a partially cut-away side view of the hand held computer controller of the present invention.

Referring now to FIGS. 4 and 5, the internal components of controller 10 are illustrated. Cursor control 12, first control button 14, and second control switch 16 are wired in a conventional manner well known to those skilled in the art to circuit board 18. Data cable 28 carries cursor position and command control signals from circuit board 18 to connector 30. Connector 30, in turn, attaches to the keyboard or serial port of the computer. Optionally, controller 10 can be equipped with an infrared transmitter or other conventional means of wireless transmission of control signals to the computer.

Thus, although there have been described particular embodiments of the present invention of a new and useful computer controller operable by hand, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A device for controlling a computer while the device is being held and operated by one hand of a user, the computer having a processor responsive to command signals and a video display with a visible cursor on the display which changes position in response to cursor position indicating signals, the user's hand having a thumb and small, ring, middle and index fingers with each finger having a center portion, the device comprising:

a. grip means for receiving the center portions of the small, ring, and middle fingers of the user's hand while the user's hand is grasping the device, the grip means having a distal end and a proximal end;

b. pedestal means for receiving the index finger of the user's hand and for separating the users's middle and index fingers while the users's hand is grasping the device, the pedestal means having an upper end and a lower end, the pedestal means not integral to the grip means;

c. thumb rest means for receiving the thumb of the user's hand while the user's hand is grasping the device, the thumb rest means attached to the upper end of the pedestal means;

d. base means for supporting the device in a free standing upright position when the device is placed on a flat surface, the base means attached to the lower end of the pedestal means;

e. the thumb rest means attached to the proximal end of the grip means, the thumb rest means having a generally circular upper surface which is angled downwardly away from the proximal end of the grip means;

f. the grip means being cylindrical in shape and extending away from the thumb rest means at a downward angle with respect to the pedestal means, the grip means and the pedestal means defining an angle of less than ninety degrees;

g. cursor control means for sending cursor position indicating signals to the computer, the cursor control means including button means located in the upper surface of the thumb rest means, the button means responsive to manipulation of the user's thumb;

h. first command signalling means for sending command signals to the computer, the first command signalling means comprising a first command button located on a forward facing surface of the pedestal means which is proximate the index finger of the user's hand when the device is being grasped; and i. second command signalling means for sending command signals to the computer, the second command signalling means comprising a second command button located on a lower surface of the grip means proximate the middle finger of the user's hand when the device is being grasped; and j. the first and second command signalling means being physically separated by the pedestal means such that the index finger is in a forward position on the forward facing surface of the pedestal means and the middle finger is in a rearward position on the lower surface of the grip means while the users's hand is grasping the device, and further such that the user's thumb on the user's hand can operate the cursor control means while the first and second command signalling means are operated by the index and middle fingers respectively of the user's hand.

\* \* \* \* \*